United States Patent [19]
Faisal

[11] Patent Number: 6,094,652
[45] Date of Patent: Jul. 25, 2000

[54] HIERARCHICAL QUERY FEEDBACK IN AN INFORMATION RETRIEVAL SYSTEM

[75] Inventor: Mohammad Faisal, San Mateo, Calif.

[73] Assignee: Oracle Corporation, Redwood Shores, Calif.

[21] Appl. No.: 09/095,515

[22] Filed: Jun. 10, 1998

[51] Int. Cl.$^7$ .................................................. G06F 17/00
[52] U.S. Cl. ...................... 707/5; 707/6; 707/4; 707/102; 707/10
[58] Field of Search .......................................... 707/1–206

[56] References Cited

U.S. PATENT DOCUMENTS

| | | | |
|---|---|---|---|
| 5,953,718 | 9/1999 | Wical | 707/5 |
| 5,956,707 | 9/1999 | Chu | 707/3 |
| 5,978,804 | 11/1999 | Dietzman | 707/10 |
| 5,980,096 | 12/1999 | Thalhammer-Reyero | 707/100 |
| 5,995,958 | 11/1999 | Xu | 707/3 |
| 6,006,221 | 12/1999 | Liddy et al. | 707/5 |

Primary Examiner—Thomas G. Black
Assistant Examiner—David Jurg
Attorney, Agent, or Firm—Stattler Johansen & Adeli LLP

[57] ABSTRACT

An information retrieval system generates hierarchical query feedback to a user to facilitate the user in reformulating the query. The information retrieval system, which supports both text and theme queries, includes a knowledge base comprising a plurality of nodes of terminology, arranged hierarchically, that reflect associations among the terminology. For the hierarchical query feedback terms, the information retrieval system selects terminology that broadens and narrows the query terms by selecting parent nodes and child nodes, respectively, of the nodes for terminology that corresponds to the terms of the query. The information retrieval system also selects terminology that is generally related to the query terms by selecting nodes of the knowledge base that are cross linked to the nodes for terminology that corresponds to the terms of the query. Normalization processing, which generates canonical forms for query processing, and a content processing system, which generates themes for theme queries, are also disclosed.

25 Claims, 10 Drawing Sheets

HIERARCHICAL QUERY FEEDBACK IN AN INFORMATION RETRIEVAL SYSTEM

BACKGROUND OF THE INVENTION

1. Field of the Invention

The present invention is directed toward the field of information retrieval systems, and more particularly towards generating feedback to a user of an information retrieval system to facilitate the user in re-formulating the query.

2. Art Background

An information retrieval system attempts to match user queries (i.e., the users statement of information needs) to locate information available to the system. In general, the effectiveness of information retrieval systems may be evaluated in terms of many different criteria including execution efficiency, storage efficiency, retrieval effectiveness, etc. Retrieval effectiveness is typically based on document relevance judgments. These relevance judgments are problematic since they are subjective and unreliable. For example, different judgement criteria assigns different relevance values to information retrieved in response to a given query.

There are many ways to measure retrieval effectiveness in information retrieval systems. The most common measures used are "recall" and "precision." Recall is defined as the ratio of relevant documents retrieved for a given query over the number of relevant documents for that query available in the repository of information. Precision is defined as the ratio of the number of relevant documents retrieved over the total number of documents retrieved. Both recall and precision are measured with values ranging between zero and one. An ideal information retrieval system has both recall and precision values equal to one.

One method of evaluating the effectiveness of information retrieval systems involves the use of recall-precision graphs. A recall-precision graph shows that recall and precision are inversely related. Thus, when precision goes up recall typically goes down and vice-versa. Although the goal of information retrieval systems is to maximize precision and recall, most existing information retrieval systems offer a trade-off between these two goals. For certain users, high recall is critical. These users seldom have means to retrieve more relevant information easily. Typically, as a first choice, a user seeking high recall may expand their search by broadening a narrow boolean query or by looking further down a ranked list of retrieved documents. However, this technique typically results in wasted effort because a broad boolean search retrieves too many unrelated documents, and the tail of a ranked list of documents contains documents least likely to be relevant to the query.

Another method to increase recall is for users to modify the original query. However, this process results in a random operation because a user typically has made his/her best effort at the statement of the problem in the original query, and thus is uncertain as to what modifications may be useful to obtain a better result.

For a user seeking high precision and recall, the query process is typically a random iterative process. A user starts the process by issuing the initial query. If the number of documents in the information retrieval system is large (e.g., a few thousand), the hit-list due to the initial query does not represent the exact information the user intended to obtain. Thus, it is not just the non-ideal behavior of information retrieval systems responsible for the poor initial hit-lists, but the user also contributes to degradation of the system by introducing error. User error manifests itself in several ways.

One way user error manifests itself is when the user does not know exactly what he/she is looking for, or the user has some idea what he/she is looking for but doesn't have all the information to specify a precise query. An example of this type of error is one who is looking for information on a particular brand of computer but does not remember the brand name. For this example, the user may start by querying for "computers." A second way user error manifests itself is when the user is looking for some information generally interesting to the user but can only relate this interest via a high level concept. An on-line world wide web surfer is an example of such a user. For example, the user may wish to conduct research on recent issues related to "Middle East", but does not know the recent issues to search. For this example, if a user simply does a search on "Middle East", then some documents relevant to the user, which deal with current issues in the "petroleum industry", will not be retrieved. The hierarchical query feedback of the present invention guides users to formulate the correct query in the least number of query iterations as possible.

Another problem in obtaining high recall and precision is that users often input queries that contain terms that do not match the terms used to index the majority of the relevant documents and almost always some of the unretrieved relevant documents (i.e., the unretrieved relevant documents are indexed by a different set of terms than those used in the input query). This problem has long been recognized as a major difficulty in information retrieval systems. See Lancaster, F. W. 1969. "MEDLARS: Reports on the Evaluation of its Operating Efficiency." American documentation, 20(1), 8–36. As is explained fully below, the hierarchical query feedback of the present invention solves the problem of matching user input queries to identify the relevant documents by providing feedback of relevant terms that may be used to reformulate the input query.

SUMMARY OF THE INVENTION

An information retrieval system generates hierarchical query feedback to a user to facilitate the user in reformulating the query. The information retrieval system receives a user query that comprises one or more terms and that identifies one or more subject matters of interest to the user. To select hierarchical query feedback terms, the information retrieval system includes a knowledge base comprising a plurality of nodes of terminology, arranged hierarchically, that reflect associations among the terminology. Specifically, the information retrieval system selects nodes of terminology in the knowledge base that reflect concepts at different levels of abstraction with respect to concepts of the terms in the query so as to identify the hierarchical query feedback terminology. In one embodiment, the information retrieval system selects terminology, for the hierarchical query feedback terms, that broadens and narrows the query terms, as well as selects terminology that is generally related to the query terms.

In one embodiment, the information retrieval system selects, as broader hierarchical query feedback terminology, nodes of the knowledge base that are parent nodes of the nodes for terminology that corresponds to the terms of the query. To select narrower hierarchical query feedback terminology, the information retrieval system selects nodes of the knowledge base that are child nodes of the nodes for terminology that corresponds to the terms of the query. The information retrieval system also selects related hierarchical query feedback terminology, which represents concepts neither broader nor narrower but related to the terms in the query, by selecting nodes of the knowledge base that are cross linked to the nodes for terminology that corresponds to the terms of the query.

DETAILED DESCRIPTION OF THE PREFERRED EMBODIMENTS

Figure 1:
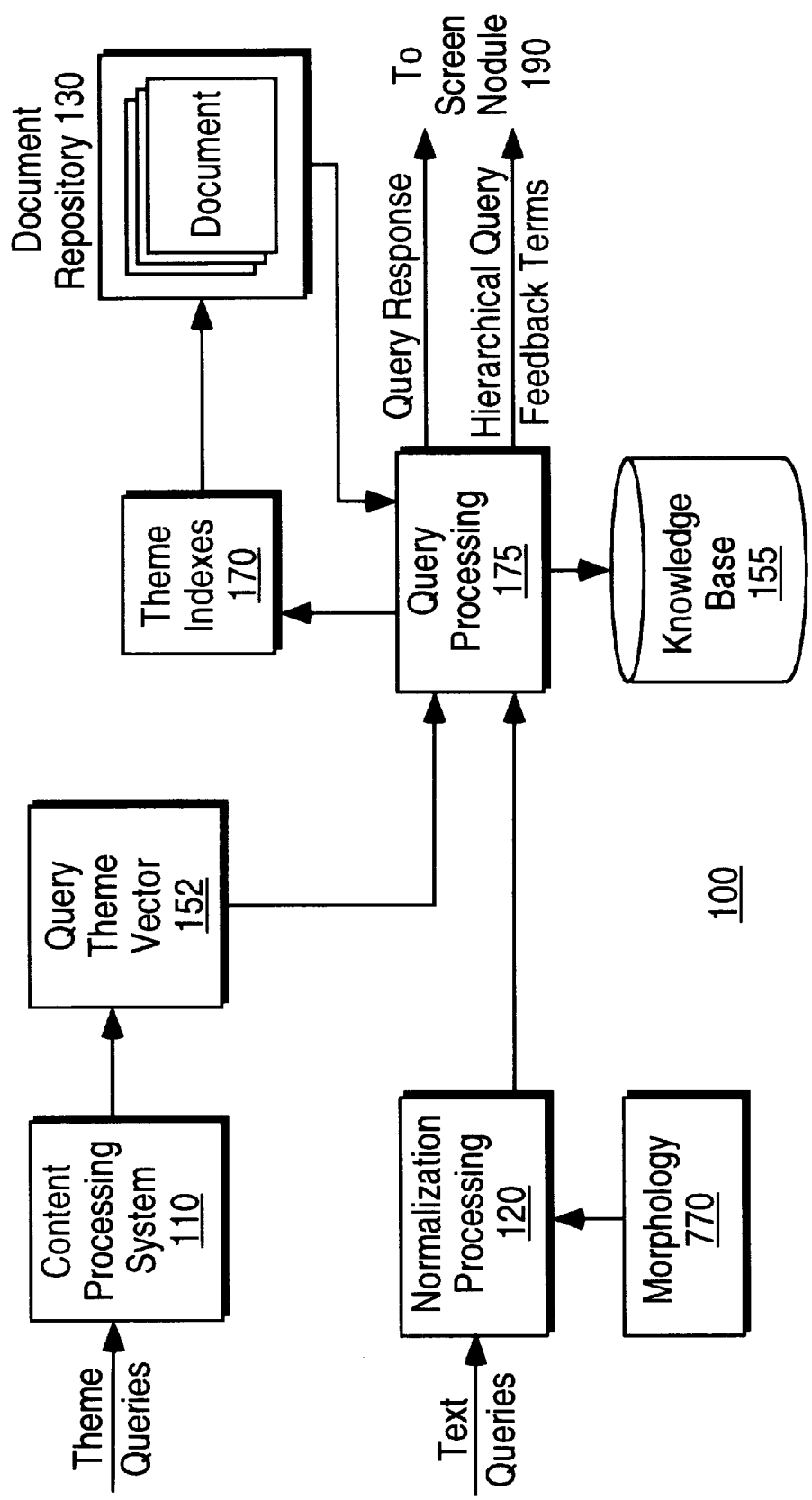
FIG. 1 is a block diagram illustrating one embodiment for the information retrieval system of the present invention.

Information Retrieval System:

FIG. 1 is a block diagram illustrating one embodiment for the information retrieval system of the present invention. In general, the information retrieval system 100 receives, as input, query terms, and generates, as output, search results including the hierarchical query feedback of the present invention. A term may consist of either a word or a phrase. For this embodiment, the information retrieval system 100 processes theme queries and text queries. For theme queries, the information retrieval system 100 processes the query terms to identify the thematic content of the query terms. Specifically, a content processing system 110 analyzes the query terms to generate a query theme vector 152. In general, the query theme vector 152 presents a thematic profile of the content of each term in the query. A further discussion of the query theme vector is described more fully below in the section "Content Processing System." The query themes are then used to process the query.

As shown in FIG. 1, the text queries are input to normalization processing 120. In text queries, the information retrieval system 100 does not analyze the text to ascertain the thematic content (i. e., identify the themes), but instead uses those terms, and their linguistic variants, to process the query. In normalization processing 120, information is extracted from morphology section 770. The normalization processing is described more fully below in conjunction with a discussion of FIG. 4. The morphology section 770 is described more fully below in the section "Content Processing System."

The information retrieval system 100 is cataloged with one or more documents, labeled documents 130 on FIG. 1. The documents 130 may include a compilation of information from any source. For example, the documents 130 may be information stored on a computer system as computer readable text. Also, the documents 130 may be accessed via a network, and stored at one or more remote locations. The content of the documents 130 may include articles, books, periodicals, etc.

Figure 7:
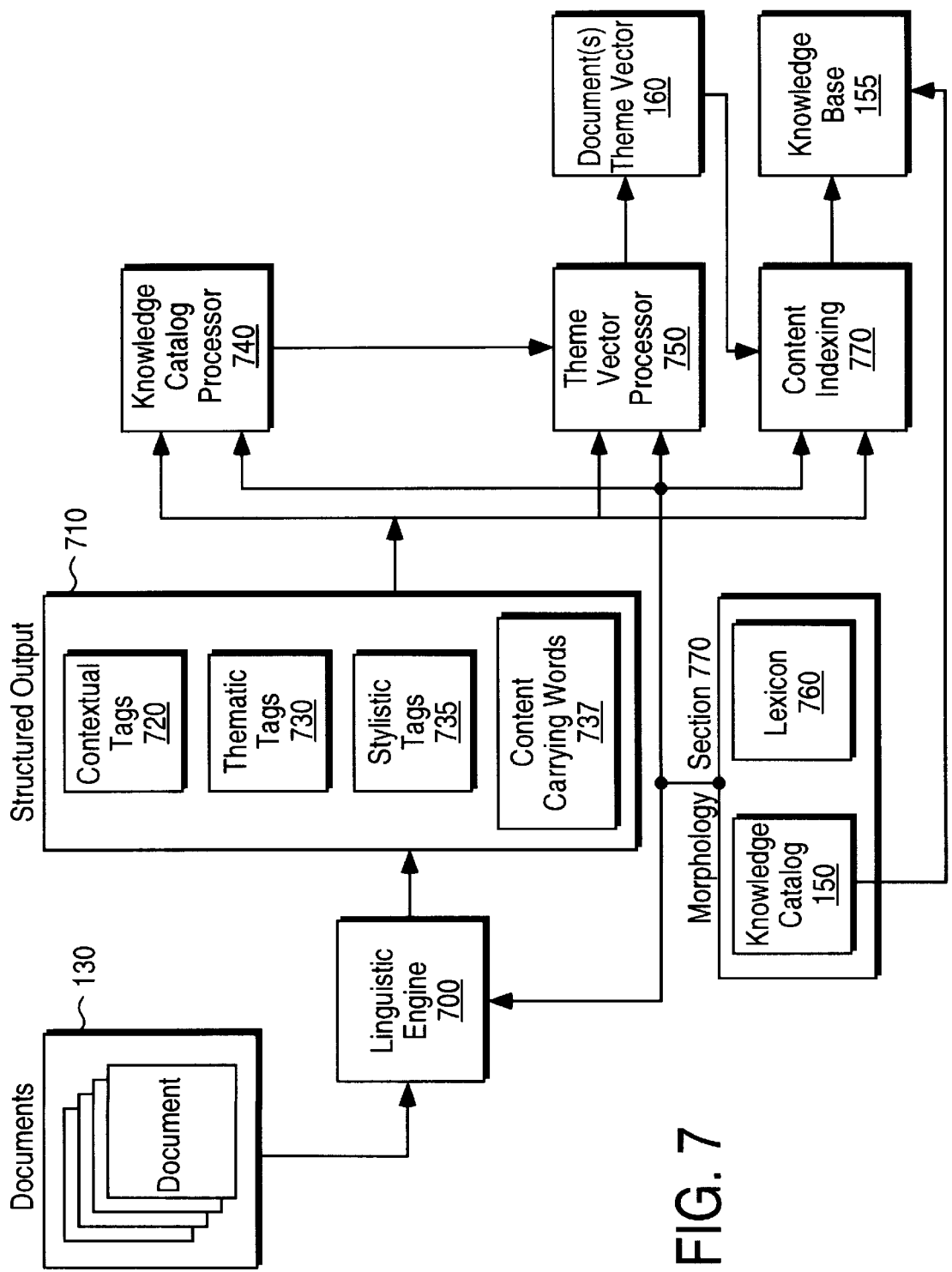
FIG. 7 is a block diagram illustrating one embodiment for a content processing system.

In one embodiment, the information retrieval system 100 operates in conjunction with the content processing system 110 to process theme queries. In general, the content processing system 110 analyzes the thematic, contextual, and stylistic aspects of the documents 130, and generates a document theme vector 160 (FIG. 7). The document theme vector 160 identifies themes for each individual document, as well as a theme strength corresponding to each theme. In addition to identifying document themes, the content processing system 110 attempts to classify each theme. Specifically, the content processing system 110 uses a classification criteria, which in one embodiment includes categories or terminology arranged hierarchically, to classify document themes in one or more categories. The classifications for document themes are identified in the document theme vector 160. The content processing system 110, used in conjunction with the information retrieval system 100, is described more fully below in the section entitled "A Content Processing System." Although the present invention is described in conjunction with the content processing system 110 which analyzes documents to provide a rich and comprehensive thematic profile and classification of the documents, any system that identifies topics to classify themes or terminology of documents may be used in conjunction with the theme queries of the information retrieval system 100 without deviating from the spirit or scope of the invention.

The information retrieval system 100 is also cataloged with theme indexes, labeled theme indexes 170 on FIG. 1. In general, the theme indexes 170 are pointers that identify all the documents in the document repository 130 that include the corresponding theme (i.e., all documents that include thematic information on the corresponding theme). For example, for the theme "computer industry", the theme indexes 170 identify all the documents in the document repository 130 that include thematic information (e.g., a theme) on the topic "computer industry." As discussed more fully below, the theme indexes 170 are used to process user input queries.

The information retrieval system 100 utilizes a knowledge base, labeled 155 on FIG. 1. In general, the knowledge base 155 includes a plurality of nodes that comprise concepts and categories, expressed as terminology augmented to include associations among the concepts and categories. In one embodiment, the knowledge base 155, may contain classification and contextual information based on processing and/or compilation of thousands of documents or may contain information based on manual selection by a linguist. The contents, generation and use of the knowledge base 155 is described more fully below in section "The Knowledge Base."

As shown in FIG. 1, the information retrieval system 100 includes query processing 175. The query processing 175 receives, as input, user queries, and generates, as output, query responses and hierarchical query feedback terms. The query processing 175 accesses documents 130, theme indexes 170, and knowledge base 155 to formulate a response to the user query. As shown in FIG. 1, query processing 175 generates both a query response and hierarchical query feedback terms. One embodiment for generating a query response, including documents in document repository 130 relevant to the query, is described in U.S. patent application Ser. No. 08/861,961, entitled "A Document Knowledge Base Search and Retrieval System", filed May 21, 1997, Inventor: Kelly Wical, which is expressly incorporated herein by reference.

The query processing 175 outputs retrieval information, including the hierarchical query feedback terminology, to a screen module 190. In general, the screen module 190 processes the hierarchical query feedbacks terms to display the terms in a predetermined form. A screen module, such as screen module 190, which processes information for display on a computer output display, is well known in the art and will not be described further.

Figure 2:
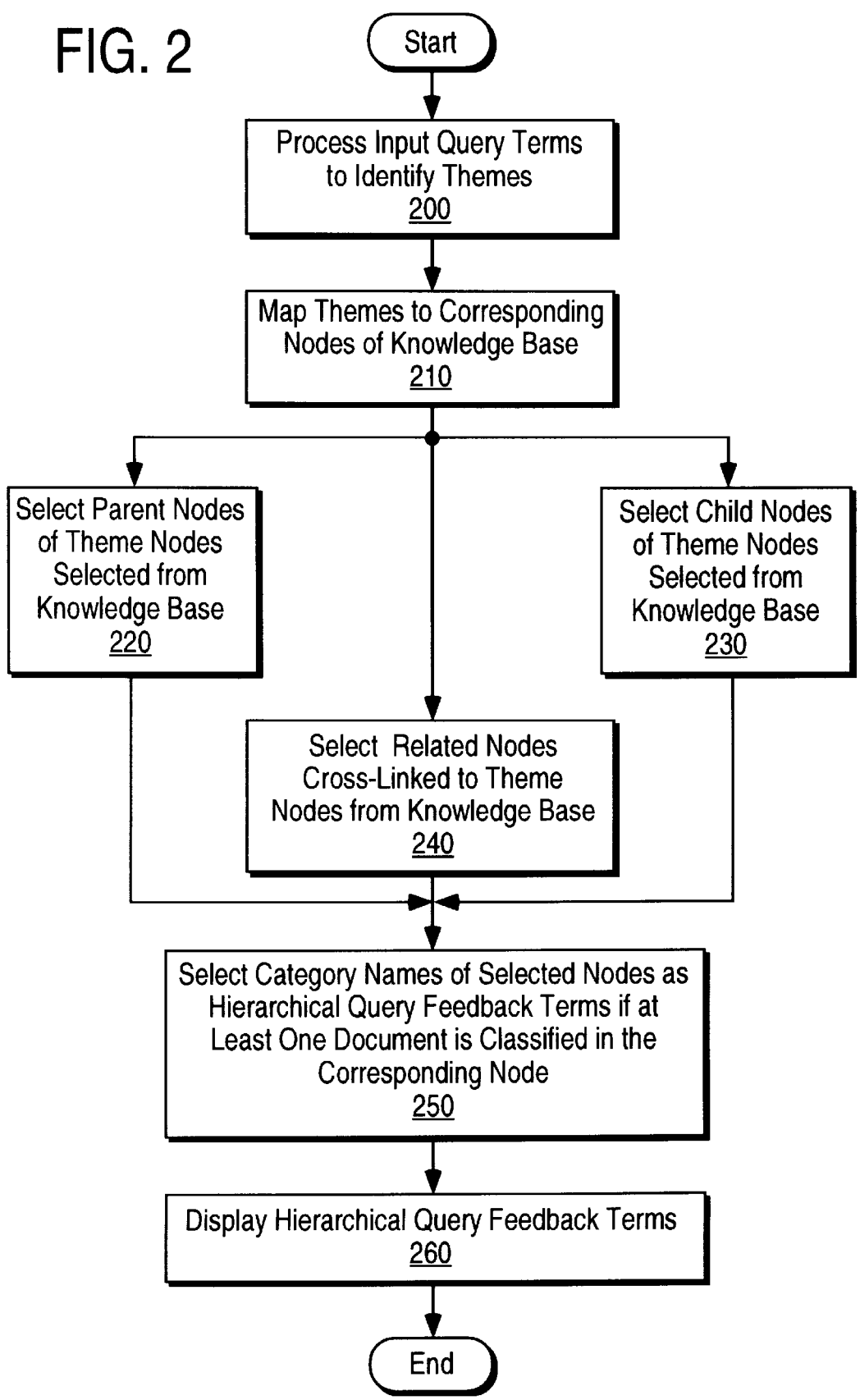
FIG. 2 is a flow diagram illustrating one embodiment for theme query processing.

Query Processing:

FIG. 2 is a flow diagram illustrating one embodiment for theme query processing. As shown in block 200, the input query terms (i.e., words and phrases) are processed to identify the thematic content. In one embodiment, the content processing system 110 (FIGS. 1 and 7) is used to identify the query themes for each term in the input query. The themes are mapped to corresponding nodes in the knowledge base 155 as shown in block 210. For example, if a theme identified from a query term is "computer industry", then the theme "computer industry" is mapped to the "computer industry" node of the knowledge base. This process is repeated for each theme identified to select theme nodes from the knowledge base.

The process then selects an expanded set of nodes from the knowledge base 155 to identify terminology that broadens, narrows, and is related to the theme nodes to generate the hierarchical query feedback terms. As shown in block 220, parent nodes of theme nodes are also selected from the knowledge base for the expanded node set to identify terminology broader than the theme nodes. In addition, related nodes, which are cross-linked to theme nodes in the knowledge base, are also selected for the expanded set of nodes as shown in block 240. Furthermore, as shown in block 230, child nodes of theme nodes in the knowledge base are selected for the expanded set of nodes to identify terminology more narrower than the theme nodes.

From the expanded set of nodes, concept names of these nodes are used as hierarchical query feedback terms if at least one document is classified in the corresponding node as shown in block 250. For example, if the node "Oracle" was selected as a related node cross-linked to the theme node "Computer Industry", then at least one document must be classified in the document repository 130 (FIG. 1) to include "Oracle" as a hierarchical query feedback term. As shown in block 260, in addition to the query response, the hierarchical query feedback terms are displayed as user feedback.

Figure 3:
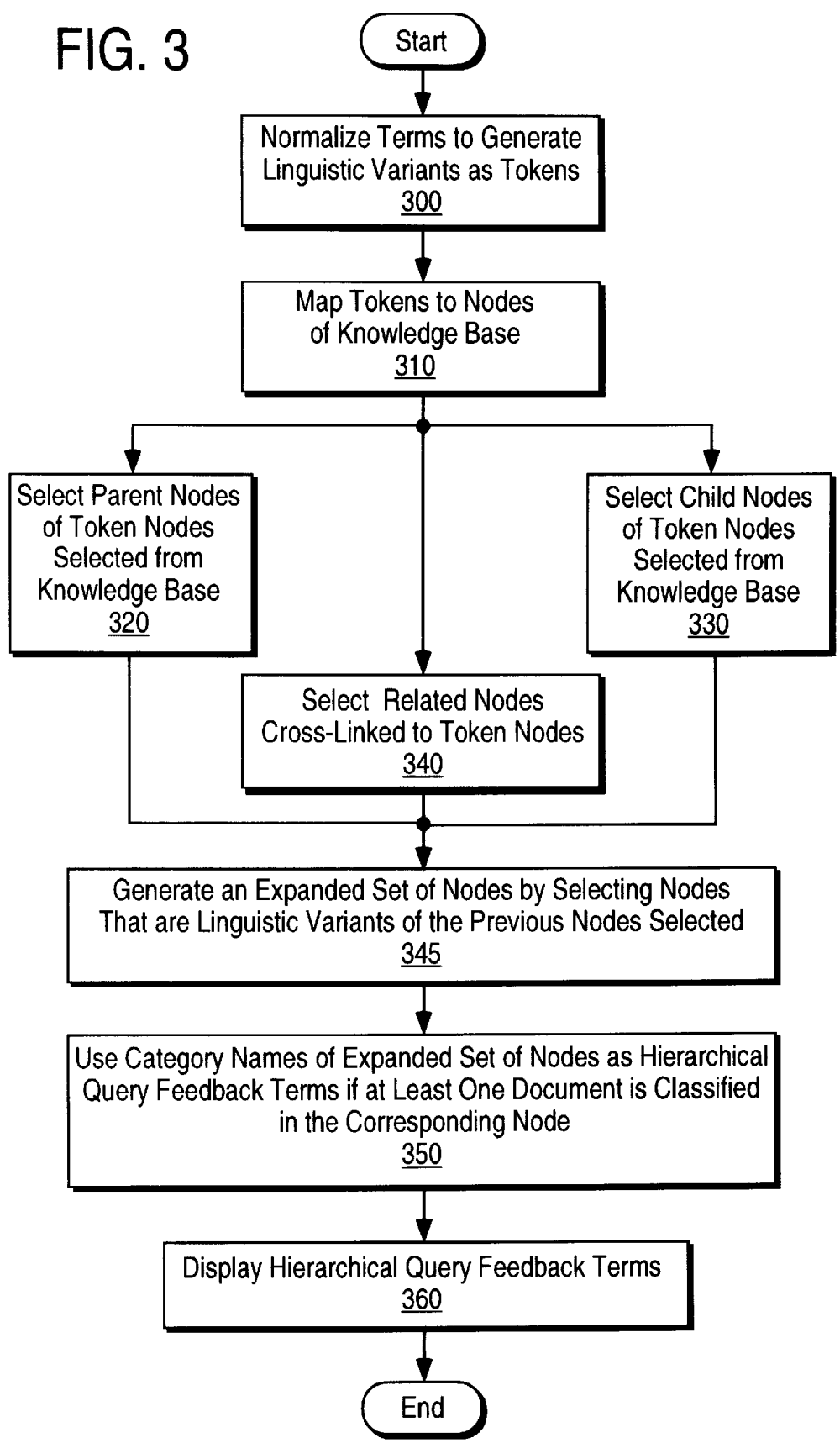
FIG. 3 is a flow diagram illustrating one embodiment for text query processing.

FIG. 3 is a flow diagram illustrating one embodiment for text query processing. As shown in block 300, the query terms (i.e., words and phrases) are normalized to generate tokens for use in query processing. The tokens consist of either the query term or one or more linguistic variants of the query term. The process to normalize query terms is described more fully below in conjunction with a description of FIG. 4. As shown in block 310 of FIG. 3, the tokens are mapped to nodes of the knowledge base to generate a set of token nodes. Based on the token nodes, an expanded set of nodes from the knowledge base are selected to identify terminology that broadens, narrows, and is related to the terminology of the token nodes. Specifically, as shown in block 320, parent nodes of the token nodes are selected to identify terminology broader than the token nodes. As shown in block 330, to identify terminology narrower than the terminology of the token nodes, child nodes of the token nodes are selected. To identify terminology generally related to terminology of the token nodes, nodes cross-linked to the token nodes in the knowledge base are selected as shown in block 340. As shown in block 345, the set of nodes is further expanded to include nodes that are the linguistic variants of the previously selected nodes.

To identify hierarchical query feedback terminology, concept names from the expanded set of nodes are used if at least one document is classified in a corresponding node as shown in block 350. As shown in block 360, the hierarchical query feedback terms are displayed in conjunction with a query response.

Figure 4:
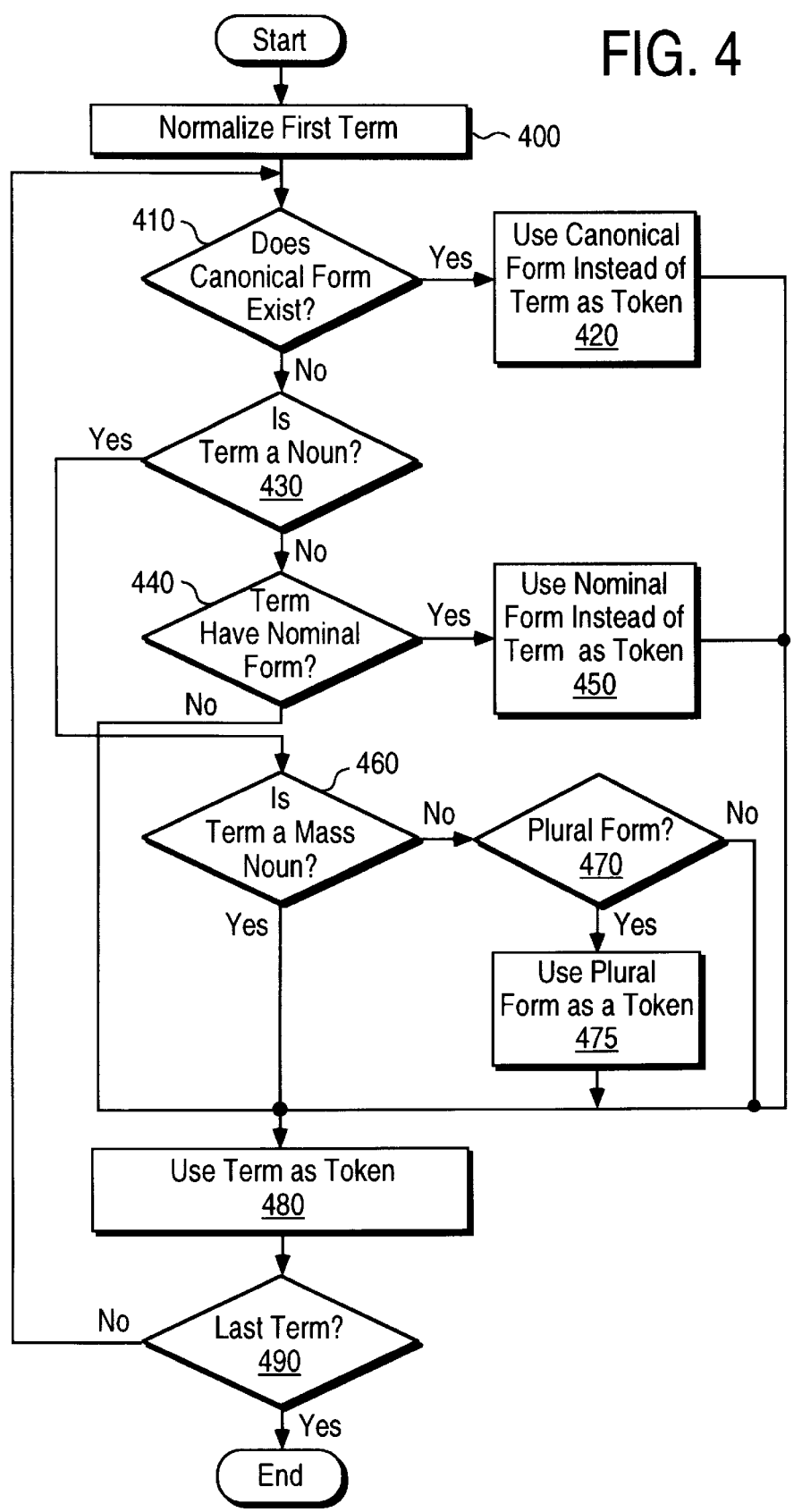
FIG. 4 is a flow diagram illustrating one embodiment for normalizing query terms.

FIG. 4 is a flow diagram illustrating one embodiment for generating linguistic variants. Although the process is described in conjunction with normalizing (i.e., generating linguistic variants) for query terms, the same process applies to generating linguistic variants in general. Starting with the first query term, normalization processing 120 (FIG. 1) determines whether a canonical form exists for the query term as shown in blocks 400 and 410. In general, nominalization refers to a noun form for a non-noun based word. Different languages have different criteria for defining the canonical form of a noun. The canonical or base form of a term is typically ascertained by looking up the term in the lexicon 760 (FIG. 7). If the transformation from token to canonical or base form cannot be accomplished by looking up the token in the lexicon 760, morphological processing can be executed on the token in an attempt to create the base form from some set of transformations. This is a language specific process, and the quality of the base form so generated is directly related to the quality of the morphology. If the term is a noun, then it has a canonical form. In rare cases, morphology can be executed on the noun to find its canonical form.

Words with suffixes, such as "tion" and "ity", are the preferred canonical forms for query processing. In some cases, morphology unrelated forms of a noun with a bad suffix are chosen as canonical forms as long as their meaning is preserved. Table 1 lists examples of the preferred canonical form of a noun and a list of alternate forms for the noun indented.

TABLE 1 beauty beautifulness
beautiousness
beauties
scamps scampishness
scampishnesses
scamp
stupidity dull-headedness
dull-headednesses
lame-brainedness
lame-brainednesses
stupidities
cooperation cooperating Exceptions to this rule are nouns that have become very common in their "ness", "ing" or "bility" forms, or are not readily separable from their suffixes such as "sickness", "fishing" and "notability."

Similar to non-noun based forms, canonical nouns do not have mood-changing prefixes. Table 2 lists three non-noun base forms, in their canonical forms, with non-mood-changing prefixes indented.

TABLE 2 spots unspottedness
spottedness
professionalism unprofessionalism
taste distastefulness
tastefulness Exceptions to this rule are, as with non-noun based forms, those nouns which, when the prefix is removed, do not retain their meaning or even their part of speech. Examples of these exceptions are "distension", "exploration", or "unction".

As shown in block 420 of FIG. 4, if the canonical form exists, then the canonical form is used instead of the query term as the token for query processing. As shown in block 430 of FIG. 4, normalization processing 120 ascertains whether the query term is a noun. In one embodiment, the lexicon 760 (FIG. 7) indicates whether the query term is a noun.

In English, proper nouns are defined as nouns that represent specific people, places, days and months, organizations, businesses, products, religious items, or works of art Proper nouns initial letters are almost always capitalized. Exceptions to capitalization are rare, and are usually for artistic or attention getting reasons. A proper noun phrase is a noun phrase that begins and ends with a proper noun. Table 3 lists valid proper nouns or noun phrases.

TABLE 3

Chicago
IBM
Carlton Fisk
October
International Business Machines Corporation
International Society of Engineers
e.e. cummings
Judgement Day Table 4 lists noun phrases that are not valid proper noun phrases.

TABLE 4

California condor
heart of Texas
AWOL (this is an acronym of a common noun phrase)

In very rare cases, proper nouns or noun phrases pluralize. If they do, the plural form is canonical. For example, "Texans" is the canonical form of "Texan." Also, "Geo Prisms" is the canonical form of "Geo Prism."

When a proper noun phrase is represented by an acronym, the canonical form is a phrase consisting of the acronym, without periods, followed by a hyphened followed by the full unabbreviated noun phrase. Each possible form of the acronym and the phrase it stands for becomes the alternate form of the new canonical form. Table 5 lists the canonical form first with the non-exhaustive examples of alternate forms indented.

TABLE 5

IBM - International Business Machines Corporation

IBM
I.B.M.
International Business Machines Corporation
International Business Machines Corp.
IBM Corp.
MISL - Major Indoor Soccer League MISL
M.I.S.L.
Major Indoor Soccer League Commercial names also appear as query terms. There are many alternate forms for most commercial proper noun phrases. Those phrases, although do not have acronyms associated with them, still require a consistent canonical form representation. For English proper noun phrases, Table 6 lists a set of rules for commercial names.

TABLE 6

All abbreviations will be spelled out

Inc. --> Incorporated
Int'l. --> International
Org. --> Organization
Hyphens will be preferred where there is a choice Long Term --> Long-Term
Alka Seltzer --> Alka-Seltzer
Ampersands will be used in place of the word 'and'

Cahill, Gordon and Reindel --> Cahill, Gordon & Reindel
Growth and Income --> Growth & Income The rules, set forth in Table 6, when combined in proper noun phrases with multiple features, create many alternate forms from a single canonical form. Since there is no way to predict how a company or product is going to be referred to in a query, this proliferation of alternate forms is necessary to achieve consistent representations whenever possible. Table 7 lists the canonical form of a corporation, and then continue with an indented list of alternate forms.

TABLE 7

Cahill, Gordon & Reindel

Cahill, Gordon and Reindel
Cahill, Gordon, & Reindel
Cahill, Gordon, and Reindel
Commodore International, Incorporated Commodore, Inc.
Commodore Inc.
Commodore, Inc
Commodore, Incorporated
Commodore Incorporated
Commodore International
Commodore International, Inc.
Commodore International Inc.
Commodore International, Inc
Commodore International Inc
Commodore International Incorporated
Commodore Int'l., Inc.
Commodore Int'l., Inc
Commodore Int'l. Inc.
Commodore Int'l. Inc
Commodore Int'l. Incorporated
Commodore Int'l., Incorporated
Commodore Int'l, Inc.
Commodore Int'l, Inc TABLE 7-continued Commodore Int'l Inc.
Commodore Int'l Inc
Commodore Int'l Incorporated
Commodore Int'l, Incorporated The canonical forms of common noun phrases are created using the same rules as single common nouns and proper noun phrases. The mass singular form is preferred, the count plural form is next as illustrated in FIG. 4. Any abbreviations, acronyms, hyphens or ampersands are handled as they are in proper noun phrases. Table 8 lists canonical forms and common noun phrases, indented, that pertain to the canonical form.

TABLE 8 atomic bombs

A-bomb
A bomb
A-bombs
A bombs
atom bomb
atom bombs
atomic bomb
satirical poetry satirical poetries Some noun phrases refer to the same entity, and are referred to as "multiple referents." Cases where different nouns or noun phrases refer to exactly the same entity, then one noun is usually selected as the canonical form, and the other nouns considered alternate forms. Table 9 lists noun and noun phrases that refer to the same entity, wherein the canonical form is left justified and the alternate forms are indented.

TABLE 9

Mark Twain

Samuel Clemens
Samuel L Clemens
Samuel L. Clemens
Samuel Longhorn Clemens
angelfish angelfishes
scalare
scalares As shown in block 440 of FIG. 4, if the query term is not a noun, then a determination is made as to whether the query term has a nominal form. If the query term has a nominal form, then the nominal form is used as a token, instead of the query term as shown in block 450. If the term does not have a nominal form, then the query term is used as the token as shown in block 480.

If the term is a noun, as ascertained in block 430, then a further inquiry determines whether the query term is a mass noun as shown in block 460. The preferred canonical form of a noun or noun phrase in English is its mass singular form. Nouns, which are mass only nouns, such as "chess" or "goats milk" have only one form, and this is the canonical form. However, most nouns that are mass nouns are also count nouns. The canonical form of count nouns is typically the mass singular form. Examples of these types of nouns are "description", "fish", and "cheese." The count plural forms of these nouns ("descriptions", "fishes", and "cheeses") are referred to as alternate forms, and are transformed to the mass singular form for use as tokens.

As shown in block 460 of FIG. 4, if the query term is not a mass noun, then the normalization processing determines whether the query term has a plural form as shown in block 470. If a noun or a noun phrase does not have a mass sense, then its canonical form is the count plural form. Nouns such as "chemical", "personal computer", and "California Condor" are alternate forms of the canonicals "chemicals", "personal computers", and "California Condors", respectively. If the plural form does exist, then the plural form is used as the token for query processing as shown in block 475. If the plural form does not exist, then the query term is used as the token as shown in block 480. Whether mass or count, there are several noun candidates for canonical form which are very close in meaning, but which have various levels of desirability based on morphology. Typically, nouns ending in "ness", "ming", and "bility" do not make very good canonical forms and are usually listed as alternate forms of more basic nouns. Unsuffixed forms are preferred. As shown in block 490 of FIG. 4, the nominalization process is repeated for each query term.

The normalization processing 120 also includes processes to eliminate the case sensitivity problem, when appropriate. The content processing system 110 (FIG. 7) includes a lexicon 760. The lexicon 760 contains information (e.g., definitional characteristics) for a plurality of words. One definitional characteristic defines the part of speech for the corresponding word. For example, the lexicon 760 identifies whether a word is a common noun. Furthermore, the lexicon 760 identifies the amount of content carrying information for a corresponding word. In general, the normalization processing 120 utilizes the definitional characteristics in the lexicon to determine whether to generate a lower case term from an upper case term when input as a query term. In one embodiment, the normalization processing 120 generates lower case terms if the corresponding upper case term is both a common noun and a content carrying word. Names, which are proper nouns, are not converted. For query terms converted, both the upper case term and the lower case term are used to process the query. Although certain upper case terms are converted to lower case terms, the original upper case query term is considered more relevant to the original query than the lower case term.

FIGS. 5a–5d illustrate an example of hierarchical query feedback in accordance with one embodiment of the present invention. For this example, a user inputs the query "Internet technology." Through normalization, either in normalization processing 120 or content processing 110, the query term "Internet technology" is flagged as a noun phrase (i.e., the terms are considered a single token). The token "Internet technology" is mapped to the "Internet technology" node in the knowledge base as shown by the arrow coupling the phrase Internet technology to the node labeled "Internet technology" on FIG. 5a.

Figure 5A:
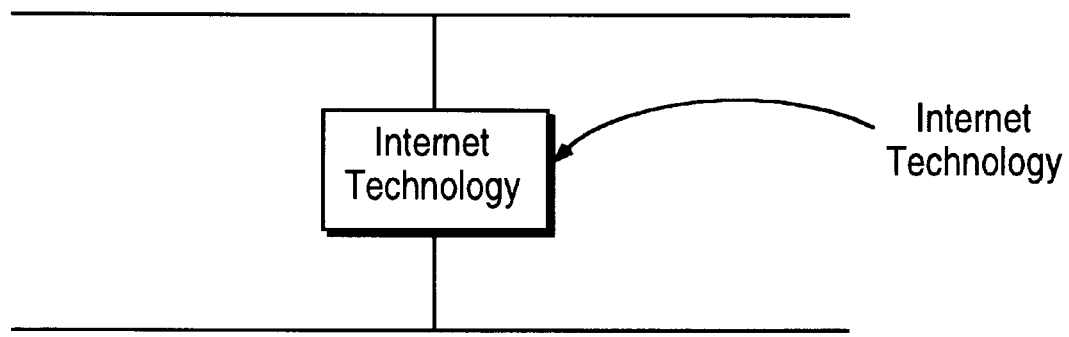
FIGS. 5a–5d illustrate an example of hierarchical query feedback in accordance with one embodiment of the present invention.
Figure 5B:
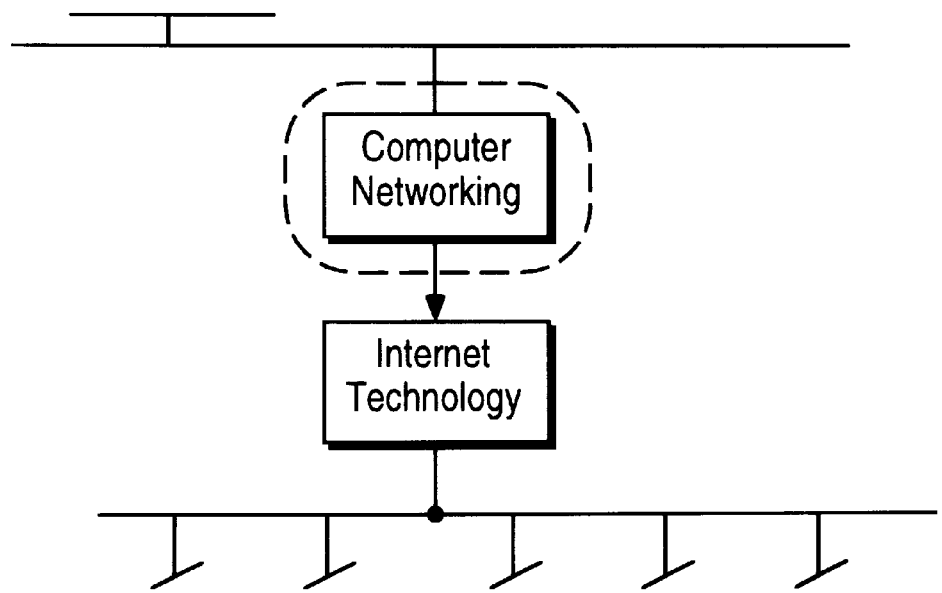
Figure 5C:
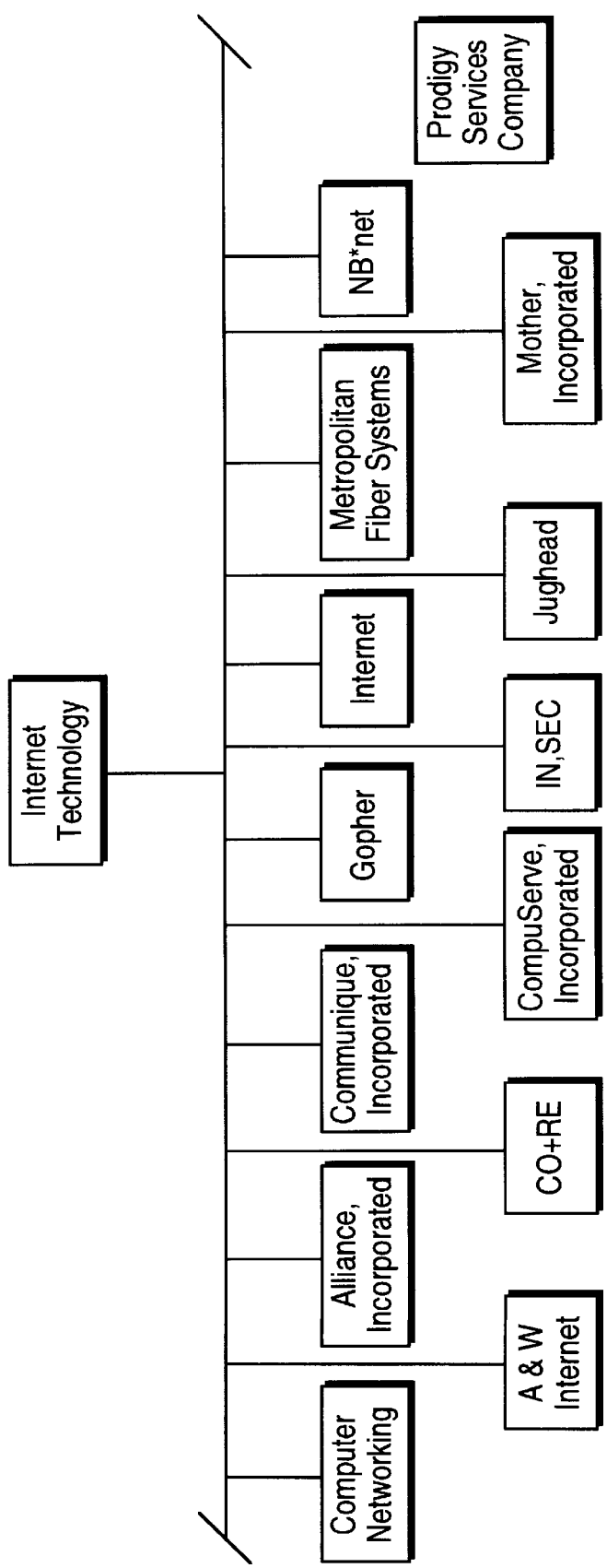

To select a broader category, the term "computer networking" is selected since the node "computer networking" is a parent node to the token node "Internet technology", as shown in FIG. 5b. In one embodiment, a maximum of one broader feedback term is provided as hierarchical query feedback. To identify terminology that is narrower than the term "Internet technology", child categories of the token node "Internet technology" is selected. FIG. 5c illustrates a portion of a knowledge base that includes child nodes for the parent node "Internet technology." As shown in FIG. 5c, numerous child nodes are selected.

Figure 5D:
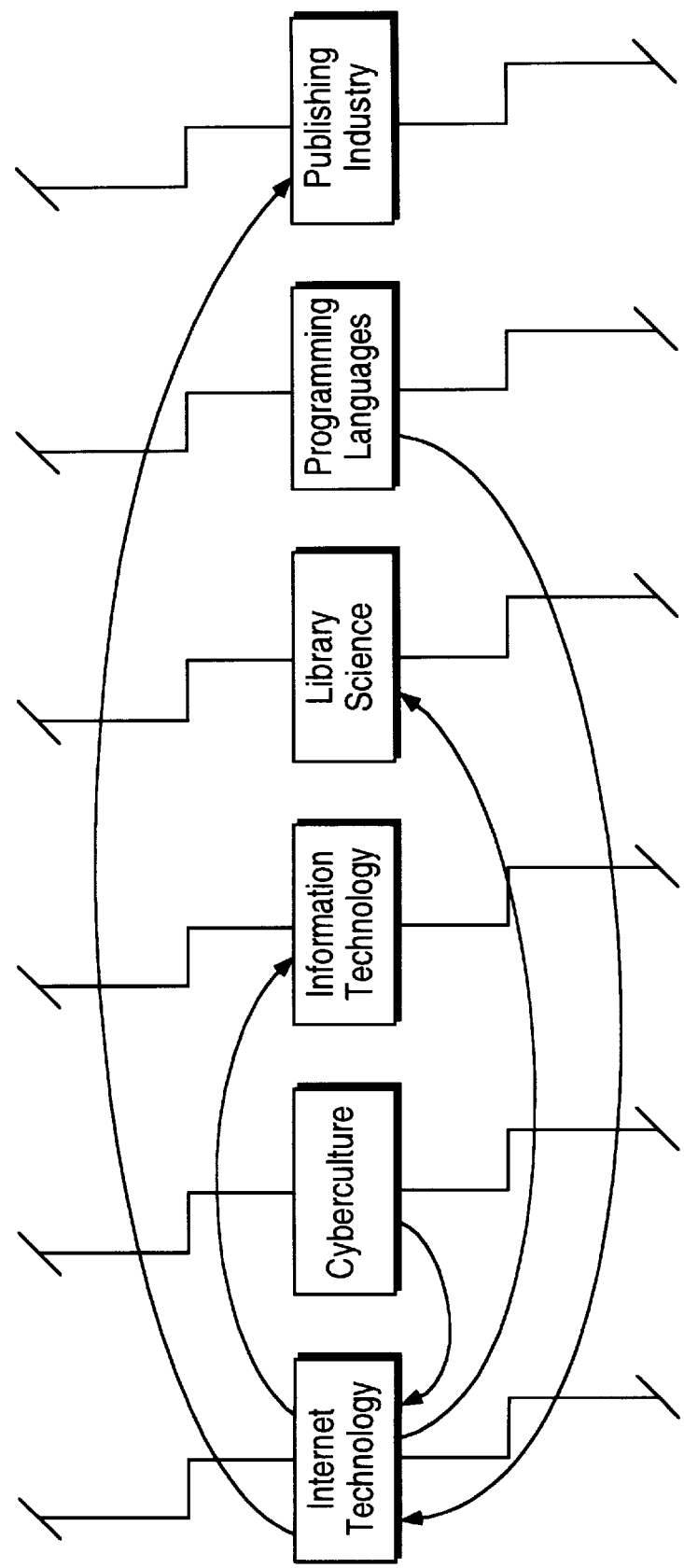

To identify related terminology for the query "Internet technology", related terminology, cross-inked to the token node "Internet technology", is selected as related feedback terminology. FIG. 5d illustrates a portion of a knowledge base that includes terminology cross-linked to the "Internet technology" node.

Table 10 lists the composite hierarchical query feedback terminology for the example query shown in FIGS. 5a–5d for the example query "Internet technology."

TABLE 10

| Feedback Type | Feedback Term | Cardinality |
| --- | --- | --- |
| Broader | computer networking | 26 |
| Narrower | A & W Internet | 4 |
| Narrower | Alliance, Incorporated | 32 |
| Narrower | CO + RE | 1 |
| Narrower | Communique, Incorporated | 2 |
| Narrower | CompuServe, Incorporated | 6 |
| Narrower | Gopher | 1 |
| Narrower | IN, SEC | 278 |
| Narrower | Internet | 4 |
| Narrower | Jughead | 1 |
| Narrower | Metropolitan Fiber Systems | 1 |
| Narrower | Mother, Incorporated | 539 |
| Narrower | NB*net | 384 |
| Narrower | Prodigy Services Company | 10 |
| Narrower | Prospero | 4 |
| Narrower | Spry, Incorporated | 1 |
| Narrower | Support Group, Incorporated | 1344 |
| Narrower | WWW - World Wide Web | 2 |
| Narrower | Yahoo | 1 |
| Narrower | bulletin boards | 3 |
| Narrower | electronic forms | 1 |
| Narrower | resource center | 2 |
| Narrower | zNET | 15 |
| Related | cyberculture | 12 |
| Related | information technology | 88 |
| Related | library science | 83 |
| Related | programming languages | 15 |
| Related | publishing industry | 3302 |

Table 10 includes three columns: feedback type, feedback term, and cardinality. For this embodiment, for each feedback term, a cardinality value is shown. The cardinality for a feedback term indicates the potential size of the hit-list retrieved if that term, input by itself, were the input query. For example, if the input query consisted of "computer networking", then 26 documents, identified from the document repository 130, would be retrieved for that input query. Knowledge Base:

In general, the knowledge base 155 is the repository for all knowledge about languages and about the concrete and abstract worlds described by language in human discourse. The knowledge base 155 contains two major types of data: language specific data necessary to describe a language used for human discourse, and language independent data necessary to describe the meaning of human discourse.

In general, in nominalization processing, given a term, the goal is to analyze and manipulate its language dependent features until a language independent ontological representation is found. The knowledge base 155 consists of concepts, general categories, and cross-references. Concepts, or detailed categories, are a subset of the canonical forms determined by the language dependent data. These concepts themselves are language independent. In different languages their text representations may be different; however, these terms represent the universal ontological location. Concepts are typically thought of as identification numbers that have potentially different representations in different languages. These representations are the particular canonical forms in those languages. General categories are themselves concepts, and have canonical form representations in each language. These categories have the additional property that other concepts and general categories can be associated with them to create a knowledge hierarchy. Cross references are links between general categories. These links augment the ancestry links that are generated by the associations that form a directed graph.

The ontology in the knowledge base 155 contains only canonical nouns and noun phrases, and it is the normalization processing 120 that provides mappings from non-nouns and non-canonical nouns. The organization of the knowledge base 155 provides a world view of knowledge, and therefore the ontology actually contains only ideas of canonical nouns and noun phrases. The text representation of those ideas is different in each language, but the ontological location of the ideas in the knowledge base 155 remains the same for all languages.

The organizational part of the knowledge base 155 is the structured category hierarchy comprised at the top level of general categories. These categories represent knowledge about how the world is organized. The hierarchy of general categories is a standard tree structure. In one embodiment, a depth limit of sixteen levels is maintained. The tree organization provides a comprehensive structure that permits augmentation of more detailed information. The tree structure results in a broad but shallow structure. The average depth from tree top to a leaf node is five, and the average number of children for non-leaf nodes is 4.5.

There are two types of general categories: concrete and abstract. This distinction is an organizational one only and it has no functional ramifications. A concrete category is one that represents a real-world industry, field of study, place, technology or physical entity. The following are examples of concrete categories: "chemistry", "computer industry", "social identities", "Alabama", and "Cinema." An abstract category is one that represents a relationship, quality, fielding or measure that does not have an obvious physical real-world manifestation. The following examples are abstract categories: "downward motion", "stability", "stupidity, foolishness, fools", "mediation, pacification", "texture", and "shortness."

Many language dependent canonical forms mapped to the language independent concepts stored as the knowledge base 155. The concept is any idea found in the real world that can be classified or categorized as being closely associated with one and only one knowledge base 155 general category. Similarly, any canonical form in a particular language can map to one and only one concept. For example there is a universal concept for the birds called "cranes" in English, and a universal concept for the machines called "cranes" in English. However, the canonical form "cranes" does not map to either concept in English due to its ambiguity. In another language, which may have two different canonical forms for these concepts, mapping may not be a problem. Similarly, if "cranes" is an unambiguous canonical form in another language, then no ambiguity is presented in mapping.

Cross references are mappings between general categories that are not directly ancestrally related, but that are close to each other ontologically. Direct ancestral relationship means parent-child, grandparent-grandchild, great grandparent-great grandchild, etc. Cross references reflect a real-world relationship or common association between the two general categories involved. These relationships can usually be expressed by universal or majority quantification over one category. Examples of valid cross references and the relationships are shown in Table 11.

TABLE 11 oceans --> fish (all oceans have fish)
belief systems --> moral states (all belief systems address moral states)
electronics --> physics (all electronics deals with physics)
death and burial --> medical problems (most cases of death and burial are caused by medical problems)

Cross references are not automatically bidirectional. For example, in the first entry of Table 11, although oceans are associated with fish, because all oceans have fish, the converse may not be true since not all fish live in oceans. The names for the general categories are chosen such that the cross references that involve those general categories are valid with the name or label choices. For example, if there is a word for fresh water fish in one language that is different than the word for saltwater fish, the oceans to fish cross reference is not valid if the wrong translation of fish is used. Although the knowledge base 155 is described as cross linking general categories, concepts may also be linked without deviating from the spirit and scope of the invention.

Figure 6:
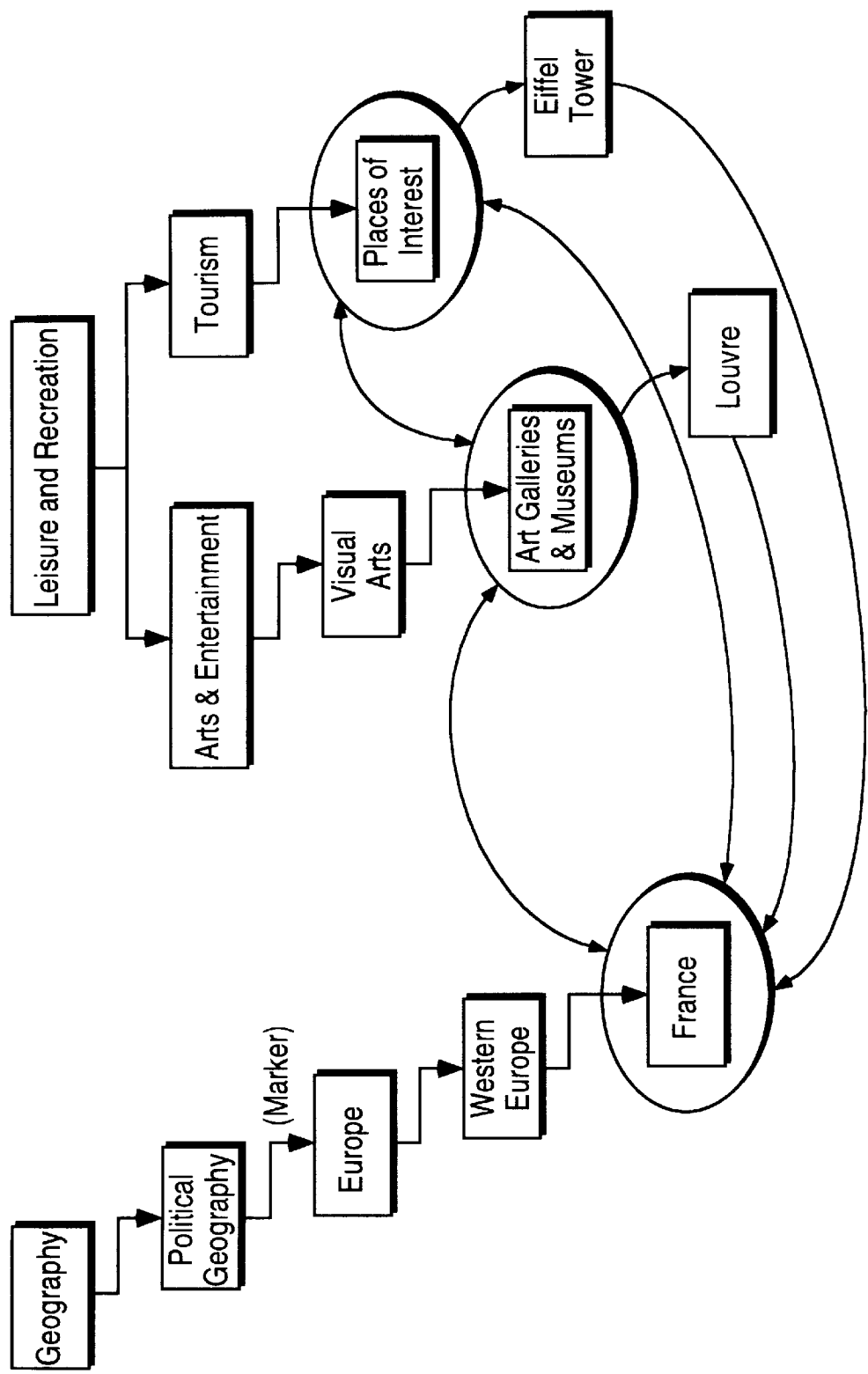
FIG. 6 illustrates an example portion of a knowledge base augmented to include additional terminology as well as cross references and links among categories and terms.

FIG. 6 illustrates an example portion of a knowledge base augmented to include additional terminology as well as cross references and links among categories and terms. The classification hierarchy and notations shown in FIG. 6 illustrate an example that classifies a document on travel or tourism, and more specifically on traveling to France and visiting museums and places of interest. As shown in FIG. 6, the classification categories (e.g., knowledge catalog 150) contains two independent static ontologies, one ontology for "geography", and a second ontology for "leisure and recreation." The "geography" ontology includes categories for "political geography", "Europe", "Western Europe", and "France." The categories "arts and entertainment" and "tourism" are arranged under the high level category "leisure and recreation." The "visual arts" and the "art galleries and museums" are subcategories under the "arts and entertainment" category, and the category "places of interest" is a subcategory under the category "tourism."

The knowledge base 155 is augmented to include linking and cross referencing among categories for which a linguistic, semantic, or usage association has been identified. For the example illustrated in FIG. 6, the categories "France", "art galleries and museums", and "places of interest" are cross referenced and/or linked as indicated by the circles, which encompass the category names, as well as the lines and arrows. This linking and/or cross referencing indicates that the categories "art galleries and museums" and "places of interest" may appear in the context of "France."

For this example, the knowledge base 155 indicates that the Louvre, a proper noun, is classified under the category "art galleries and museums", and further associates the term "Louvre" to the category "France." Similarly, the knowledge base 155 indicates that the term "Eiffel Tower" is classified under the category "places of interest", and is also associated with the category "France."

The knowledge base 155 may be characterized, in part, as a directed graph. The directed graph provides information about the linguistic, semantic, or usage relationships among categories, concepts and terminology. The "links" or "cross references" on the directed graph, which indicate the associations, is graphically depicted in FIG. 6 using lines and arrows. For the example shown in FIG. 6, the directed graph indicates that there is a linguistic, semantic, or usage association among the concepts "France", "art galleries and museums", and "places of interest."

Content Processing System:

FIG. 7 is a block diagram illustrating one embodiment for a content processing system. In general, the content processing system 110 analyzes the document set 130 and generates the document theme vector 160. For this embodiment, the content processing system 110 includes a linguistic engine 700, a knowledge catalog processor 740, a theme vector processor 750, and a morphology section 770. The linguistic engine 700 receives, as input, the document set 130, and generates, as output, the structured output 710. The linguistic engine 700, which includes a grammar parser and a theme parser, processes the document set 130 by analyzing the grammatical or contextual aspects of each document, as well as analyzing the stylistic and thematic attributes of each document. Specifically, the linguistic engine 700 generates, as part of the structured output 710, contextual tags 720, thematic tags 730, and stylistic tags 735 that characterize each document. Furthermore, the linguistic engine extracts topics and content carrying words 737, through use of the thematic tags 730, for each sentence in the documents. For a detailed description of the contextual and thematic tags, see U.S. Pat. No. 5,694,523, inventor Kelly Wical, entitled "Content Processing for Discourse", filed May 31, 1995, that includes an Appendix D, entitled "Analysis Documentation."

In one embodiment, the linguistic engine 700 generates the contextual tags 720 via a chaos loop processor. All words in a text have varying degrees of importance in the text, some carrying grammatical information, and others carrying the meaning and content of the text. In general, the chaos loop processor identifies, for words and phrases in the documents, grammatical aspects of the documents including identifying the various parts of speech. In order to accomplish this, the chaos loop processor ascertains how the words, clauses and phrases in a sentence relate to each other. By identifying the various parts of speech for words, clauses, and phases for each sentence in the documents, the context of the documents is defined. The chaos loop processor stores information in the form of the contextual tags 720. U.S. Pat. No. 5,694,523, inventor Kelly Wical, entitled "Content Processing System for Discourse", filed May 31, 1995, includes an Appendix C, entitled "Chaos Processor for Text", that contains an explanation for generating contextual or grammatical tags.

A theme parser within the linguistic engine 700 generates the thematic tags 730. Each word carries thematic information that conveys the importance of the meaning and content of the documents. In general, the thematic tags 730 identify thematic content of the document set 130. Each word is discriminated in the text, identifying importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria defines which of the discriminated words are to be selected for each thematic analysis unit. The text is then output in a predetermined thematic format. For a further explanation of a theme parser, see Appendix E, entitled "Theme Parser for Text", of U.S. Pat. No. 5,694,523, inventor Kelly Wical, entitled "Content Processing System for Discourse", filed May 31, 1995.

As shown in FIG. 7, the morphology section 770 contains the knowledge catalog 150 and a lexicon 760. In one embodiment, the knowledge catalog 150 identifies categories for the document themes. For this embodiment, the knowledge catalog 150 contains categories, arranged in a hierarchy, that reflect a world view of knowledge. Appendix A of U.S. Pat. No. 5,694,523, inventor Kelly Wical, entitled "Content Processing System for Discourse", filed May 31, 1995, which is herein expressly incorporated by reference, is an example of a knowledge catalog for use in classifying documents. Although the present invention is described in conjunction with a knowledge catalog used to classify documents, any classification criteria that identifies topics or categories may be used in conjunction with the present invention without deviating from the spirit or scope of the invention.

In general, the lexicon 760 stores definitional characteristics for a plurality of words and terms. For example, the lexicon 212 defines whether a particular word is a noun, a verb, an adjective, etc. The linguistic engine 700 uses the definitional characteristics stored in the lexicon 760 to generate the contextual tags 720, thematic tags 730, and the stylistic tags 735. An example lexicon, for use with a content processing system, is described in Appendix B, entitled "Lexicon Documentation", of U.S. Pat. No. 5,694,523, inventor Kelly Wical, entitled "Content Processing System for Discourse", filed May 31, 1995.

The topics and content carrying words 737 are input to the knowledge catalog processor 740. In part, the knowledge catalog processor 740 processes the content carrying words for direct use with the knowledge catalog 150 and knowledge base 155. Specifically, the knowledge catalog processor 740 generates, as appropriate, the nominal or noun form of each content carrying word, as well as the count sense and mass sense of the word. Furthermore, the knowledge catalog processor 740 determines, from the knowledge catalog 150, which content carrying words are non ambiguous.

As shown in FIG. 7, the theme vector processor 750 receives the thematic tags 730 and contextual tags 720 from the structured output 710. In addition, the non ambiguous content carrying words from the knowledge catalog processor 740 are input to the theme vector processor 750. The content carrying words may include single words or phrases. The content carrying words output from the knowledge catalog processor 240 are converted to the noun or nominal form. In general, the theme vector processor 750 presents a thematic profile of the content of each document (e.g., generates the document theme vector 160 including classifying the documents in the knowledge catalog 150. To accomplish this, the theme vector processor 750 determines the relative importance of the non ambiguous content carrying words in the document set.

In one embodiment, the theme vector processor 750 generates a list of theme terms, including words and phrases, and assigns a relative theme strength to each theme term. The theme vector processor 750, through use of the knowledge catalog 150, generates a theme concept for each theme term by mapping the theme terms to categories in the knowledge catalog 150. Thus, the theme concepts indicate a general topic or category in the knowledge catalog 150 to identify the content of each document. In addition, the theme vector processor 750 generates, for each theme term, an importance number, a theme strength, and an overall capacity weight of collective content importance.

Table 12 is an example document theme vector 160.

TABLE 12

| Document Theme Vector | | |
|---|---|---|
| Document Themes | Theme Strength | Classification Category |
| Theme$_1$ | 190 | (category$_a$) |
| Theme$_2$ | 110 | None |
| Theme$_3$ | 70 | (Category$_c$) |
| Theme$_4$ | 27 | (Category$_d$) |
| . | . | . |
| . | . | . |
| . | . | . |
| Theme$_n$ | 8 | (Category$_z$) |

As shown in Table 12, a document theme vector 160 for a document includes a list of document themes, indicated in Table 1 by Theme$_1$–Theme$_n$. Each theme has a corresponding theme strength. The theme strength is calculated in the theme vector processor 750. The theme strength is a relative measure of the importance of the theme to the overall content of the document. For this embodiment, the larger the theme strength, the more important the theme is to the overall content of the document. The document theme vector 160 lists the document themes from the most important to the least important themes (e.g., theme$_1$–theme$_n$).

The document theme vector 160 for each document further includes, for some themes, a category for which the theme is classified. The classification category is listed in the third column of the document theme vector shown in Table 12. For example, theme$_1$ is classified in category$_a$, and theme$_3$, is classified in category$_o$.

In one embodiment, the theme vector processor 750 executes a plurality of heuristic routines to generate the theme strengths for each theme. U.S. Pat. No. 5,694,523, inventor Kelly Wical, entitled "Content Processing System for Discourse", contains source code to generate the theme strengths in accordance with one embodiment for theme vector processing. Also, a further explanation of generating a thematic profile is contained in U.S. Pat. No. 5,694,523, inventor Kelly Wical, entitled "Content Processing System for Discourse", filed May 31, 1995, which is herein incorporated by reference.

Figure 8:
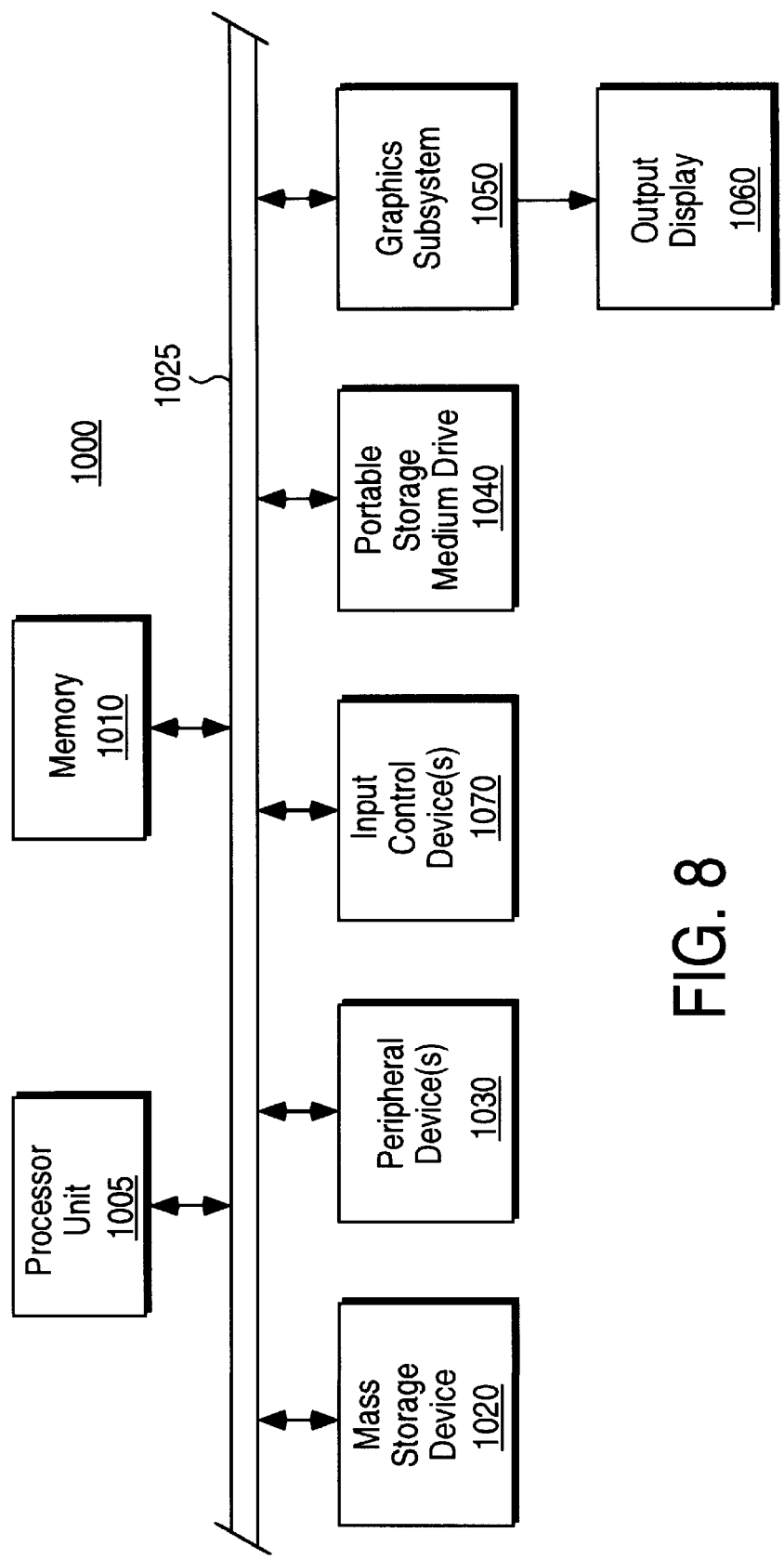
FIG. 8 illustrates a high level block diagram of a general purpose computer system in which the information retrieval system of the present invention may be implemented.

Computer System:

FIG. 8 illustrates a high level block diagram of a general purpose computer system in which the information retrieval system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the information retrieval system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. or purposes of simplicity, all components in the computer system 1000 are shown in FIG. 8 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the information retrieval system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the information retrieval system software is stored on such a portable medium, and is input to the computer system 1000 via the portable storage medium drive 1040. The peripheral device (s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the documents may be input to the computer system 1000 via a portable storage medium or a network for processing by the information retrieval system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The information retrieval system may be implemented in either hardware or software. For the software implementation, the information retrieval system is software that includes a plurality of computer executable instructions for implementation on a general purpose computer system. Prior to loading into a general purpose computer system, the information retrieval system software may reside as encoded information on a computer readable medium, such as a magnetic floppy disk, magnetic tape, and compact disc read only memory (CD-ROM). In one hardware implementation, the information retrieval system may comprise a dedicated processor including processor instructions for performing the functions described herein. Circuits may also be developed to perform the functions described herein. The knowledge catalog 150 and knowledge database 155 may be implemented as a database stored in memory for use by the information retrieval system.

Although the present invention has been described in terms of specific exemplary embodiments, it will be appreciated that various modifications and alterations might be made by those skilled in the art without departing from the spirit and scope of the invention.

What is claimed is:

1. A method for providing hierarchical query feedback to a user in an information retrieval system, said method comprising the step of:

receiving a query, comprising one or more terms, input to said information retrieval system that identifies one or more subject matters of interest to a user;

storing a knowledge base comprising a plurality of nodes of terminology, arranged hierarchically, that reflect associations among said terminology;

processing said query by selecting nodes of terminology in said knowledge base that reflect concepts at different levels of abstraction with respect to concepts associated with said terms in said query so as to identify hierarchical query feedback terminology; and displaying, in response to said query, said hierarchical query feedback terminology, whereby a user may utilize said hierarchical query feedback terminology to formulate a new query that more particularly identifies said subject matters of interest.

2. The method as set forth in claim 1, wherein:

the step of processing said query to identify hierarchical query feedback terminology comprises the step of identifying broader hierarchical query feedback terminology that represents concepts broader than said terms in said query; and the step of displaying said hierarchical query feedback terminology comprises the step of displaying said broader hierarchical query feedback terminology.

3. The method as set forth in claim 2, wherein the step of identifying broader hierarchical query feedback terminology comprises the steps of:

selecting nodes of said knowledge base for terminology that corresponds to said terms of said query; and selecting, as broader hierarchical query feedback terminology, nodes of said knowledge base that are parent nodes of said nodes for terminology that corresponds to said terms of said query.

4. The method as set forth in claim 1, wherein:

the step of processing said query to identify hierarchical query feedback terminology comprises the step of identifying narrower hierarchical query feedback terminology that represents concepts narrower than said terms in said query; and the step of displaying said hierarchical query feedback terminology comprises the step of displaying said narrower hierarchical query feedback terminology.

5. The method as set forth in claim 4, wherein the step of identifying narrower hierarchical query feedback terminology comprises the steps of:

selecting nodes of said knowledge base for terminology that corresponds to said terms of said query; and selecting, as narrower hierarchical query feedback terminology, nodes of said knowledge base that are child nodes of said nodes for terminology that corresponds to said terms of said query.

6. The method as set forth in claim 1, wherein:

the step of processing said query to identify hierarchical query feedback terminology comprises the step of identifying related hierarchical query feedback terminology that represents concepts, although neither broader nor narrower, related to said terms in said query; and the step of displaying said hierarchical query feedback terminology comprises the step of displaying said related hierarchical query feedback terminology.

7. The method as set forth in claim 6, wherein the step of identifying related hierarchical query feedback terminology comprises the steps of:

selecting nodes of said knowledge base for terminology that corresponds to said terms of said query; and selecting, as related hierarchical query feedback terminology, nodes of said knowledge base that are cross linked to said nodes for terminology that corresponds to said terms of said query.

8. The method as set forth in claim 1, further comprising the step of displaying a cardinality value with a hierarchical query feedback term to indicate a number of documents retrievable in response to said hierarchical query feedback term.

9. The method as set forth in claim 1, wherein the step of storing a knowledge base comprises the step of storing a knowledge base comprising a directed graph that associates terminology having a lexical, semantic or usage association.

10. The method as set forth in claim 1, further comprising the steps of:

determining one or more themes from said terms of said query, wherein said themes comprise terminology that reflects an overall thematic content of said term; and selecting nodes of said knowledge base for terminology that corresponds to said themes.

11. The method as set forth in claim 10, further comprising the steps of:

generating linguistic variants for said nodes selected, said linguistic variants including a canonical form; and selecting an expanded set of nodes in said knowledge base for terminology that corresponds to said linguistic variants.

12. The method as set forth in claim 1, further comprising the steps of:

generating linguistic variants of terms in said query, said linguistic variants including a canonical form; and selecting nodes of said knowledge base for terminology that corresponds to said linguistic variants.

13. A computer readable medium comprising a plurality of instructions, which when executed, causes the computer to perform the steps of:

receiving a query, comprising one or more terms, input to said information retrieval system that identifies one or more subject matters of interest to a user;

storing a knowledge base comprising a plurality of nodes of terminology, arranged hierarchically, that reflect associations among said terminology;

processing said query by selecting nodes of terminology in said knowledge base that reflect concepts at different levels of abstraction with respect to concepts associated with said terms in said query so as to identify hierarchical query feedback terminology; and displaying, in response to said query, said hierarchical query feedback terminology, whereby a user may utilize said hierarchical query feedback terminology to formulate a new query that more particularly identifies said subject matters of interest.

14. The computer readable medium as set forth in claim 13, wherein:

the step of processing said query to identify hierarchical query feedback terminology comprises the step of identifying broader hierarchical query feedback terminology that represents concepts broader than said terms in said query; and the step of displaying said hierarchical query feedback terminology comprises the step of displaying said broader hierarchical query feedback terminology.

15. The computer readable medium as set forth in claim 14, wherein the step of identifying broader hierarchical query feedback terminology comprises the steps of:

selecting nodes of said knowledge base for terminology that corresponds to said terms of said query; and selecting, as broader hierarchical query feedback terminology, nodes of said knowledge base that are parent nodes of said nodes for terminology that corresponds to said terms of said query.

16. The computer readable medium as set forth in claim 13, wherein:

the step of processing said query to identify hierarchical query feedback terminology comprises the step of identifying narrower hierarchical query feedback terminology that represents concepts narrower than said terms in said query; and the step of displaying said hierarchical query feedback terminology comprises the step of displaying said narrower hierarchical query feedback terminology.

17. The computer readable medium as set forth in claim 16, wherein the step of identifying narrower hierarchical query feedback terminology comprises the steps of:

selecting nodes of said knowledge base for terminology that corresponds to said terms of said query; and selecting, as narrower hierarchical query feedback terminology, nodes of said knowledge base that are child nodes of said nodes for terminology that corresponds to said terms of said query.

18. The computer readable medium as set forth in claim 13, wherein:

the step of processing said query to identify hierarchical query feedback terminology comprises the step of identifying related hierarchical query feedback terminology that represents concepts, although neither broader nor narrower, related to said terms in said query; and the step of displaying said hierarchical query feedback terminology comprises the step of displaying said related hierarchical query feedback terminology.

19. The computer readable medium as set forth in claim 18, wherein the step of identifying related hierarchical query feedback terminology comprises the steps of:

selecting nodes of said knowledge base for terminology that corresponds to said terms of said query; and selecting, as related hierarchical query feedback terminology, nodes of said knowledge base that are cross linked to said nodes for terminology that corresponds to said terms of said query.

20. The computer readable medium as set forth in claim 13, further comprising the step of displaying a cardinality value with a hierarchical query feedback term to indicate a number of documents retrievable in response to said hierarchical query feedback term.

21. The computer readable medium as set forth in claim 13, wherein the step of storing a knowledge base comprises the step of storing a knowledge base comprising a directed graph that associates terminology having a lexical, semantic or usage association.

22. The computer readable medium as set forth in claim 13, further comprising the steps of:

determining one or more themes from said terms of said query, wherein said themes comprise terminology that reflects an overall thematic content of said term; and selecting nodes of said knowledge base for terminology that corresponds to said themes.

23. The computer readable medium as set forth in claim 22, further comprising the steps of:

generating linguistic variants for said modes selected, said linguistic variants including a canonical form; and selecting an expanded set of nodes in said knowledge base for terminology that corresponds to said linguistic variants.

24. The computer readable medium as set forth in claim 13, further comprising the steps of:
- generating linguistic variants of terms in said query, said linguistic variants including a canonical form; and
- selecting nodes of said knowledge base for terminology that corresponds to said linguistic variants.

25. A computer system comprising:
- a user input device for receiving a query, comprising one or more terms, input to said information retrieval system that identifies one or more subject matters of interest to a user;
- storage device for storing a knowledge base comprising a plurality of nodes of terminology, arranged hierarchically, that reflect associations among said terminology;
- processing unit, coupled to said storage device, for processing said query by selecting nodes of terminology in said knowledge base that reflect concepts at different levels of abstraction with respect to concepts associated with said terms in said query so as to identify hierarchical query feedback terminology; and
- an output display for displaying, in response to said query, said hierarchical query feedback terminology, whereby a user may utilize said hierarchical query feedback terminology to formulate a new query that more particularly identifies said subject matters of interest.

* * * * *